(12) United States Patent
Li (10) Patent No.: US 11,200,493 B2
(45) Date of Patent: Dec. 14, 2021

(54) SYSTEM AND METHOD FOR TRAINING NEURAL NETWORKS

(71) Applicant: Advanced New Technologies Co., Ltd., Grand Cayman (KY)

(72) Inventor: Jianshu Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/791,749

(22) Filed: Feb. 14, 2020

(65) Prior Publication Data

US 2020/0372345 A1 Nov. 26, 2020

(30) Foreign Application Priority Data

May 21, 2019 (SG) .......................... 10201904549Q (51) Int. Cl.
*G06N 3/08* (2006.01)
*G06K 9/00* (2006.01)
(Continued)

(52) U.S. Cl.
CPC ........... *G06N 3/08* (2013.01); *G06K 9/00268* (2013.01); *G06K 9/00295* (2013.01);
(Continued)

(58) Field of Classification Search
CPC .......... G06N 3/08; G06N 3/04; G06N 3/0454; G06K 9/00268; G06K 9/00295;
(Continued)

(56) References Cited

U.S. PATENT DOCUMENTS

| | | |
|---|---|---|
| 2018/0039879 A1 | 2/2018 | Shaji et al. |
| 2019/0236774 A1* | 8/2019 | Gros ...................... G16H 50/20 |
| 2019/0370684 A1* | 12/2019 | Gunes .................... G06N 20/00 |

FOREIGN PATENT DOCUMENTS

| | | |
|---|---|---|
| CN | 109376773 | 2/2019 |
| CN | 109409520 | 3/2019 |

OTHER PUBLICATIONS

Hettinger et al., "Forward Thinking: Building and Training Neural Networks One Layer at a Time", Jun. 8, 2017, 31st Conference on Neural Information Processing Systems, pp. 1-9 (Year: 2017).*

(Continued)

*Primary Examiner* — Alan Chen
*Assistant Examiner* — Brent Johnston Hoover
(74) *Attorney, Agent, or Firm* — Fish & Richardson P.C.

(57) ABSTRACT

A computer-implemented method comprising: training a pre-trained neural network that comprises: an input layer; a plurality of hidden layers, wherein each of the plurality of hidden layers has one or more nodes, wherein each of said one or more nodes has an associated weight trained based on data from a source domain; and an output layer. Training the pre-trained neural network comprises: introducing at least one additional layer to the plurality of hidden layers, wherein said additional layer has one or more nodes having associated weights; keeping weights of the nodes in the plurality of hidden layers of the pre-trained neural network unchanged; inputting data from a target domain to the input layer; and adjusting weights of the one or more nodes in the at least one additional layer based on features obtained at the output layer.

15 Claims, 5 Drawing Sheets

(51) Int. Cl.
*G06K 9/62* (2006.01)
*G06N 3/04* (2006.01)

(52) U.S. Cl.
CPC ......... *G06K 9/6228* (2013.01); *G06K 9/6256* (2013.01); *G06N 3/04* (2013.01)

(58) Field of Classification Search
CPC ............... G06K 9/6228; G06K 9/6256; G06K 9/4628; G06K 9/6262; G06K 9/6271
See application file for complete search history.

(56) References Cited

OTHER PUBLICATIONS

Chen et al., "Net2Net: Accelerating Learning via Knowledge Transfer", Apr. 23, 2016, Neurocomputing, vol. 287, pp. 1-12 (Year: 2016).*

Elhatri et al., "Extreme Learning Machine-Based Traffic Incidents Detection with Domain Adaptation Transfer Learning", Oct. 19, 2016, Journal of Intelligent Systems | vol. 26: Issue 4, pp. 601-612 (Year: 2016).*

Zhang et al., "Is Tofu the Cheese of Asia?: Searching for Corresponding Objects across Geographical Areas", Apr. 2017, WWW '17 Companion: Proceedings of the 26th International Conference on World Wide Web Companion, pp. 1033-1042 (Year: 2017).*

Crosby et al., "BlockChain Technology: Beyond Bitcoin," Sutardja Center for Entrepreneurship & Technology Technical Report, Oct. 16, 2015, 35 pages.

Huang, et al., "Cross-language knowledge transfer using multilingual deep neural network with shared hidden layers," IEEE International Conference on Acoustics, Speech and Signal Processing, 2013, May 31, 2013, pp. 7304-7308.

Nakamoto, "Bitcoin: A Peer-to-Peer Electronic Cash System," www.bitcoin.org, 2005, 9 pages.

Yosinski, et al., "How transferable are features in deep neural networks?" Advances in Neural Information Processing Systems 27 (NIPS 2014), Dec. 13, 2014, pp. 3320-3328.

* cited by examiner

SYSTEM AND METHOD FOR TRAINING NEURAL NETWORKS

CROSS-REFERENCE TO RELATED APPLICATIONS

This application claims priority to Singapore Patent Application No. 10201904549Q, filed on May 21, 2019, which is hereby incorporated by reference in its entirety.

FIELD OF INVENTION

The present invention relates broadly, but not exclusively, to methods and devices for training neural networks.

BACKGROUND

Deep learning is a method of machine learning that incorporates hierarchical neural networks in successive layers in order to learn from data in an iterative manner.

A neural network comprises of a number of interconnected nodes, called 'neurons', which are organized in three or more layers: an input layer, one or many hidden layers, and an output layer. The term deep learning is used when there are multiple hidden layers within a neural network.

Data are introduced to the neural network through the input layer, which is the first layer in the neural network. The input layer takes the input signals/values and passes them on to the hidden layers. The hidden layers have nodes which apply different transformations to the input signals/values. Each hidden layer may have a collection of nodes stacked vertically. The last hidden layer passes on values to the output layer. The output layer is the last layer in the neural network and receives input from the last hidden layer.

The data is processed in the hidden layers based on weights and/or biases applied to these nodes. In particular, the processing occurs through a system of connections characterized by the weights and biases. At each node, an input is received, the node calculates a weighted sum and may also add the bias. According to the result and a pre-set activation function, the node decides whether it should be activated. The node transmits the information downstream to other connected node.

Neural networks and deep learning are often used in image recognition (e.g. face recognition), speech, and computer vision applications. Face recognition is a recognition technique used to detect/determine faces of individuals from face images. Typically, facial features are extracted from face images in order to identify or verify a person.

To implement a face recognition system using deep learning, a pre-trained model is constructed and is trained with large-scale data. The large-scale data may be obtained from a particular country or geographical region. In this manner, the trained model works well for applications in the particular "home" country or geographical region (e.g. China). However, when the trained model is used in another country or geographical region (e.g. Europe), the performance may drop due to a change of domains from where the model was originally trained. In particular, faces in different countries or region have different characteristics/features and their own bias. Therefore, the performance in other countries or geographical regions may not be as good as the performance in the "home" country.

A need therefore exists to provide methods and devices that can minimize a significant drop in performance when the "home-brewed" model is deployed overseas.

SUMMARY

In order to improve performance of a face recognition system when a "home-brewed" pre-trained model is deployed overseas, embodiments of the invention utilize a domain adaptation technique. The domain adaptation technique involves modifying or tuning a pre-trained model that is trained on a source domain (i.e. trained using large-scale data obtained from a particular country or geographical region, e.g. China), so that the performance on the target domain (i.e. when deployed in another country or geographical region) can be improved.

According to one embodiment, an original "home-brewed" pre-trained model is adapted to the targeted new domain by employing one or more additional layers with trainable parameters. The one or more additional layers can be arranged in a cascaded or parallel configuration.

According to another embodiment, there is provided a method comprising: training a pre-trained neural network that comprises: an input layer; a plurality of hidden layers, wherein each of the plurality of hidden layers has one or more nodes, wherein each of said one or more nodes has an associated weight trained based on data from a source domain; and an output layer. Training the pre-trained neural network comprises: introducing at least one additional layer to the plurality of hidden layers, wherein said additional layer has one or more nodes having associated weights; keeping weights of the nodes in the plurality of hidden layers of the pre-trained neural network unchanged; inputting data from a target domain to the input layer; and adjusting weights of the one or more nodes in the at least one additional layer based on features obtained at the output layer.

According to another embodiment, there is provided a system for training a neural network comprising a processor module and a memory module including computer program code. The memory module and the computer program code are configured to, with the processor module, cause the system at least to: retrieve, from the memory module, a pre-trained neural network comprising: (i) an input layer; (ii) a plurality of hidden layers, wherein each of the plurality of hidden layers has one or more nodes, wherein each of the one or more nodes has an associated weight trained based on data from a source domain; and (iii) an output layer. The system is further caused to: introduce at least one additional layer to the plurality of hidden layers, wherein said additional layer has one or more nodes having associated weights; keep weights of the nodes in the plurality of hidden layers of the pre-trained neural network unchanged; input data from a target domain to the input layer; and adjust weights of the one or more nodes in the at least one additional layer based on features obtained at the output layer.

According to another embodiment, there is provided a computer-implemented method, comprising: inputting, via an input module, data from a target domain to an input layer of a pre-trained neural network, wherein the pre-trained neural network comprises: a plurality of hidden layers, wherein each of the plurality of hidden layers has one or more nodes, wherein each of said one or more nodes has an associated weight trained based on data from a source domain; and at least one additional layer introduced to the plurality of hidden layers, wherein said additional layer has one or more nodes having associated weights. The method further comprises obtaining, from an output module, features from an output layer of the pre-trained neural network; and configuring a processing module to adjust weights of the one or more nodes in the at least one additional layer based on the obtained features while keeping weights of the nodes in the plurality of hidden layers of the pre-trained neural network unchanged.

According to another embodiment, there is provided an apparatus comprising: an input module configured to receive data from a target domain; and a processing module configured feed the data to an input layer of a pre-trained neural network, wherein the pre-trained neural network comprises: a plurality of hidden layers, wherein each of the plurality of hidden layers has one or more nodes, wherein each of said one or more nodes has an associated weight trained based on data from a source domain; and at least one additional layer introduced to the plurality of hidden layers, wherein said additional layer has one or more nodes having associated weights. The apparatus further comprises an output module configured to output features from an output layer of the pre-trained neural network. The processing module is further configured to adjust weights of the one or more nodes in the at least one additional layer based on the outputted features while keeping weights of the nodes in the plurality of hidden layers of the pre-trained neural network unchanged.

BRIEF DESCRIPTION OF THE DRAWINGS

Embodiments are provided by way of example only, and will be better understood and readily apparent to one of ordinary skill in the art from the following written description, read in conjunction with the drawings, in which.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Face recognition is a technology capable of identifying or verifying a person from image data, e.g. taken from a digital image or a video frame from a video source. Face recognition typically involves a technique of extracting features from face images. The extracted facial features are used to identify or verify a person.

In order to improve performance of a face recognition system when a "home-brewed" pre-trained model is deployed overseas, embodiments of the invention utilize a domain adaptation technique. The domain adaptation technique involves modifying or tuning the pre-trained model that is trained on a source domain (i.e. trained using large-scale data obtained from a particular country or geographical region, e.g. China), so that the performance on the target domain (i.e. when deployed in another country or geographical region) can be improved.

According to one embodiment, an original "home-brewed" pre-trained model is adapted to the targeted new domain by employing one or more additional layers with trainable parameters. The parameters refer to weights and/or biases of the model. The one or more additional layers can be arranged in a cascaded or parallel configuration. Further details on the parallel and cascaded configuration will be provided below with reference to FIGS. 2 and 3, respectively.

According to one embodiment, there is provided a neural network that is used to extract face features from face images when deployed overseas. The neural network includes a pre-trained neural network that is trained with face image data from a source domain. The pre-trained neural network includes an input layer, a plurality of hidden layers and an output layer.

The neural network includes at least one additional layer that is introduced to the pre-trained neural network within the plurality of hidden layers of the pre-trained neural network. The neural network can be trained in accordance with the following protocol: (i) keep weights that are applied to each of the nodes in the hidden layers of the pre-trained neural network frozen and unchanged; (ii) select most confident samples (i.e. features with least training errors) from a target domain for training each of the at least one additional layer; and (iii) during each training iteration, adjust weights that are applied to each of the nodes in each of the at least one additional layer based on the selected most confident samples.

At least one additional layer can be introduced to the pre-trained neural network in parallel with the last hidden layer of the pre-trained neural network. A concatenation of the output from the at least one additional layer and the output from the last hidden layer of the pre-trained neural network is passed on to the output layer. This configuration is referred to as the "parallel configuration".

Alternatively, at least one additional layer can be introduced to the pre-trained neural network after the last hidden layer of the pre-trained neural network. This configuration is referred to as the "cascaded configuration".

Alternatively, a "hybrid configuration" (i.e. combination of the "parallel configuration" and "cascaded configuration") can be implemented wherein at least one additional layer is introduced to the pre-trained neural network after the last hidden layer of the pre-trained neural network, and at least one other additional layer is introduced to the pre-trained neural network in parallel with the last hidden layer of the pre-trained neural network. A "cascaded configuration" makes the neural network deeper while the "parallel configuration" makes the neural network wider.

In any of the above configurations, it is possible to add more than one additional layer. For example, in the "cascaded configuration", adding more layers makes the neural network deeper. In the "parallel configuration", adding more layers makes the neural network wider.

Figure 1:
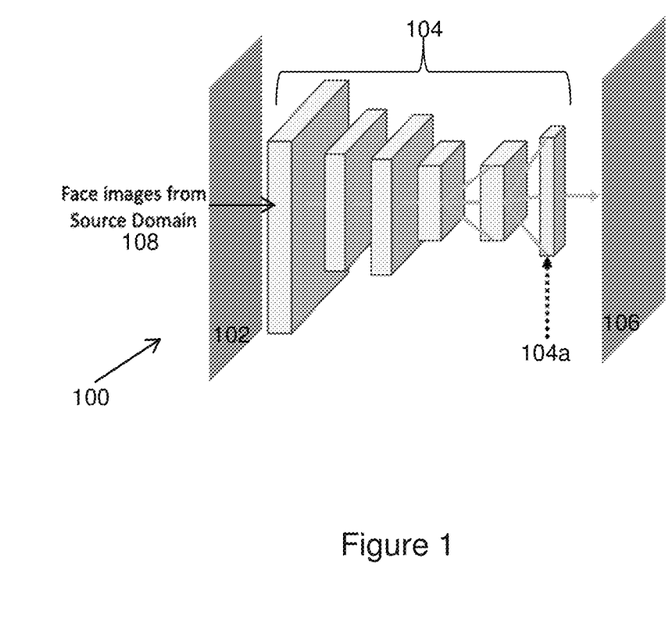
FIG. 1 is a schematic of an architecture of a pre-trained neural network.

FIG. 1 is a schematic of an architecture of a pre-trained neural network 100. The neural network 100 comprises of a number of highly interconnected nodes, which are organized in three or more layers: an input layer 102, a plurality of hidden layers 104, and an output layer 106.

During a training phase of the neural network 100, data 108 (in the form of face images from a source domain) is introduced to the neural network 100 through the input layer 102. No operations are applied on the input data 108; the input layer 102 takes the data 108 and passes them on to the plurality of hidden layers 104.

The plurality of hidden layers 104 have nodes (not shown) which apply different transformations to the data 108. Each hidden layer has a collection of nodes stacked vertically. The data are processed in the plurality of hidden layers 104 based on the weights and/or biases applied to these nodes. In particular, the processing occurs through a system of connections characterized by parameters such as weights and biases. At each node, an input is received, the node calculates a weighted sum and may also add the bias. According to the result and a pre-set activation function, the node decides whether it should be activated. The node transmits the information downstream to other connected nodes. A weight represents the strength of the connection between nodes. In other words, a weight decides how much influence the input has on the output.

The last hidden layer 104a may be referred to as a face feature layer and is the penultimate layer when training the network. The output layer 106 is the last layer in the neural network 100 and receives input from the last hidden layer 104a. At the output layer 106, face features of interest are obtained. The output at the output layer 106 contains face features that are labelled. During deployment, output layer 106 (which is labelled) is removed and the last hidden layer 104a outputs the features that the user is interested in. In this manner, a trained model is constructed using large-scale data 108 from a source domain. Typically, the data 108 from the source domain are obtained from a particular population (e.g. country or geographical region). The trained model works well for applications in the particular "home" country or geographical region (e.g. China). However, when the pre-trained model is used in another country or region (e.g. Europe), the performance may drop due to a change of domains where the model is trained.

Figure 2:
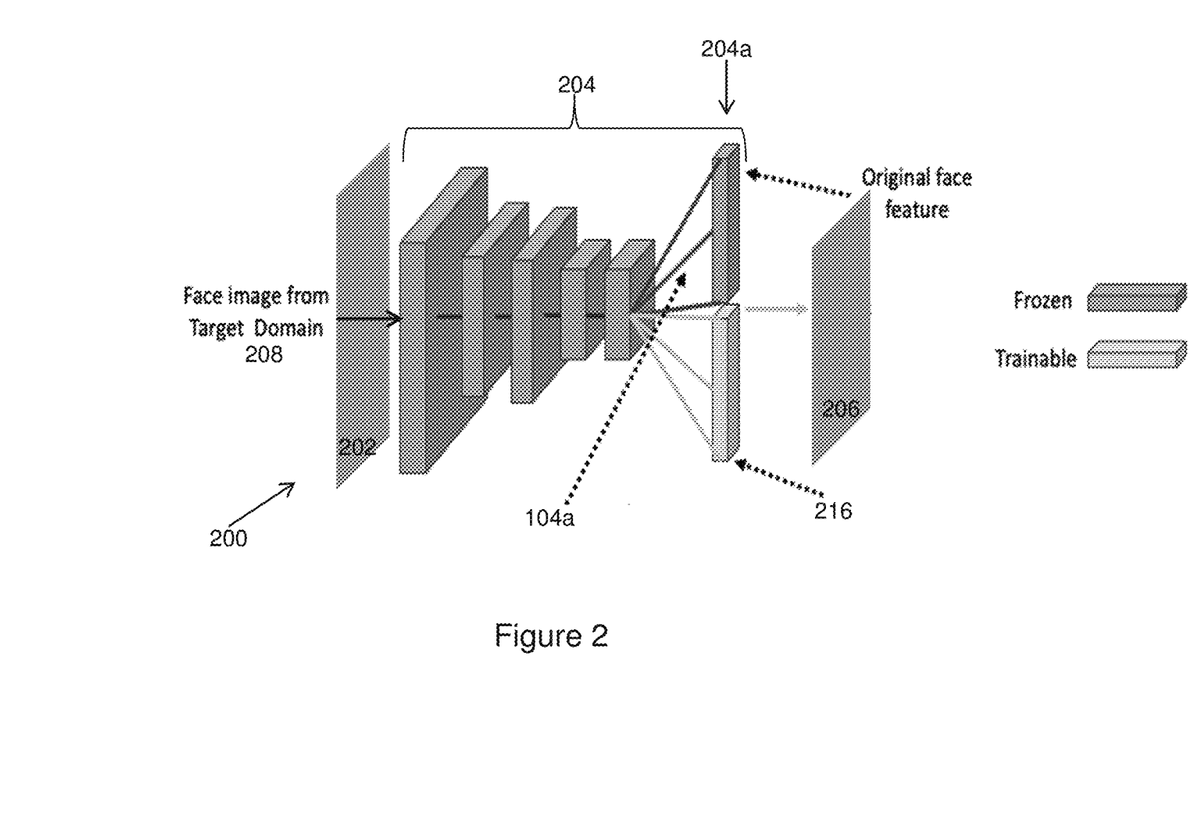
FIG. 2 is a schematic of an architecture of a neural network, according to an embodiment.

FIG. 2 is a schematic of an architecture of a neural network 200, according to an embodiment. The neural network 200 comprises of a number of interconnected nodes, which are organized in three or more layers: an input layer 202, a plurality of hidden layers 204, and an output layer 206.

The main difference between the neural network 100 described above and the neural network 200 is the introduction of a new layer 216 before the output layer 206. In other words, the final layer 204a of the plurality of hidden layers 204 comprises the original last hidden layer 104a and the newly add feature layer 216.

The input layer 202 is substantially the same as input layer 102. Except for the newly add feature layer 216, each of the plurality of hidden layers 204 is substantially the same as each of the corresponding plurality of hidden layers 104. In other words, except for the newly add feature layer 216, the weights and/or biases applied to the nodes in the plurality of hidden layers 204 remain unchanged.

During an adaptation/training phase of the neural network 200, data 208 (in the form of face images from a target domain) are introduced to the neural network 200 through the input layer 202. In contrast to the data 108 described above, the data 208 can be face images from a target domain, the target domain being a country, geographical region or area that is different from the original "home country" (i.e. source domain). The input layer 202 takes the data 208 and passes them on to the plurality of hidden layers 204.

The plurality of hidden layers 204 have nodes (not shown) which apply different transformations to the data 208. Each hidden layer may have a collection of nodes stacked vertically. The data is processed in the plurality of hidden layers based on the weights and/or biases applied to these nodes. In particular, the processing occurs through a system of connections characterized by parameters such as weights and biases. At each node, an input is received, the node calculates a weighted sum and may also add the bias. According to the result and a pre-set activation function, the node decides whether it should be activated. The node transmits the information downstream to other connected nodes. A weight represents the strength of the connection between nodes. In other words, a weight decides how much influence the input has on the output. As mentioned, except for the newly added feature layer 216, the weights applied to each of the nodes in the plurality of hidden layers 204 remain unchanged.

The output layer 206 is the last layer in the neural network 200 and receives input from the last hidden layer 204a. The last hidden layer 204a comprises two separate layers—the original last hidden layer 104a and the newly added feature layer 216.

The addition of feature layer 216 in the neural network 200 can be considered a "parallel configuration". In the parallel configuration, additional trainable parameters (e.g. weight and bias) are introduced at the newly added feature layer 216. The additional parameters are able to convert the original features to newly adapted features, which performs better than the original features. The additional parameters are able to generate a new set of features, which are parallel to the original features. A concatenation of the original feature and the new feature is used as the final feature. The original feature is unchanged, while the additional feature captures the domain variant features of the target domain. The adaptation process can be considered a fine-tuning process of the model. As described above, during the fine-tuning process, the original model's parameters (e.g. weight and bias) are kept frozen and unchanged while the newly added parameters (e.g. weight and bias) of the newly added feature layer 216 are trained.

The output at the output layer 206 is referred to as a "final feature" which is a concatenation of an original feature (from original output layer 106) and new feature (from the newly added feature layer 216). In this context, these features are abstract features from the neural network. From the perspective of the neural network, the original feature is a feature from the original feature layer 204a, and the new feature is a feature from the newly added layer(s) 216. The final feature is the concatenation of 204a and 216. The layer 206 is also referred to as the labelled layer, which is used only in training, not deployment.

Figure 3:
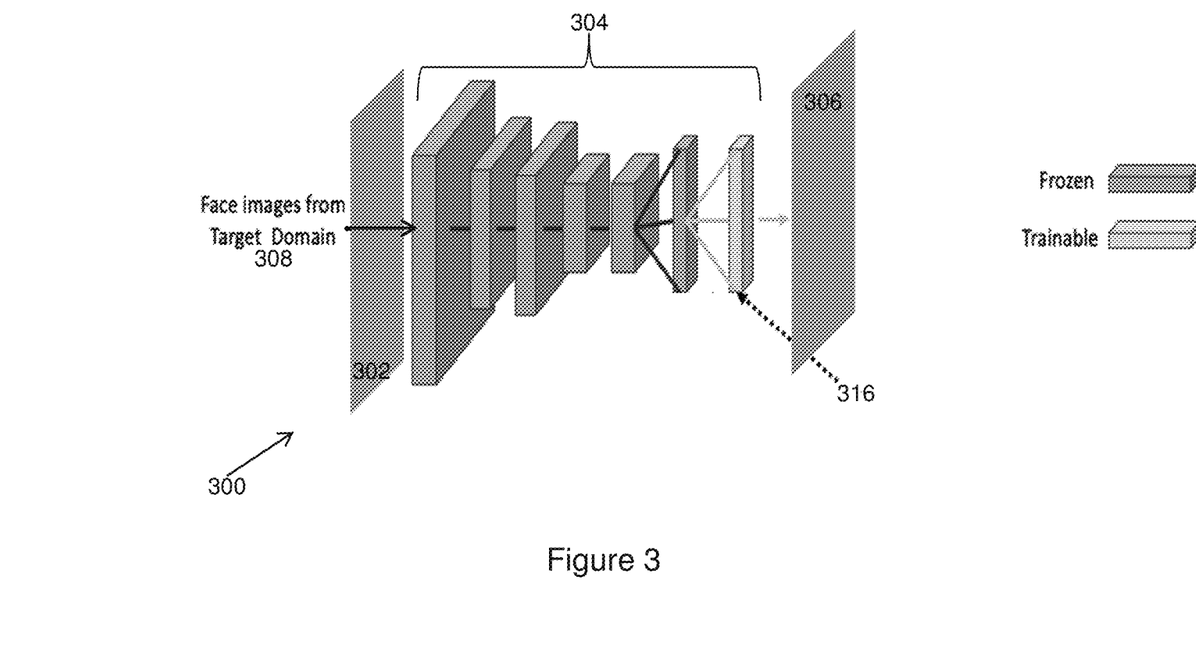
FIG. 3 is a schematic of an architecture of a neural network, according to an embodiment.

FIG. 3 is a schematic of an architecture of a neural network 300, according to an embodiment. The neural network 300 comprises of a number of interconnected nodes, which are organized in three or more layers: an input layer 302, a plurality of hidden layers 304, and an output layer 306.

The main difference between the neural network 100 described above and the neural network 300 is the introduction of a new layer 316 as the last hidden layer.

The input layer 302 is substantially the same as input layer 102. Each of the plurality of hidden layers 304 is substantially the same as each of the corresponding plurality of hidden layers 104, except for the last layer 316 in the plurality of hidden layers 304. In other words, except for the last layer 316, the weights and/or biases applied to the nodes in the plurality of hidden layers 304 remain unchanged.

During an adaptation/training phase of the neural network 300, data 308 (in the form of face images from a target domain) is introduced to the neural network 300 through the input layer 302. In contrast to the data 108 described above, the data 308 are in the form of face images from a target domain, the target domain being a country, geographical region or area that is different from the "home country" (i.e. source domain). The input layer 302 takes the data 308 and passes them on to the plurality of hidden layers 304.

The plurality of hidden layers 304 have nodes (not shown) which apply different transformations to the data 308. Each hidden layer may have a collection of nodes stacked vertically. The data is processed in the plurality of hidden layers based on the weights and/or biases applied to these nodes. In particular, the processing occurs through a system of connections characterized by parameters such as weights and biases. At each node, an input is received, the node calculates a weighted sum and may also add the bias. According to the result and a pre-set activation function, the node decides whether it should be activated. The node transmits the information downstream to other connected nodes. A weight represents the strength of the connection between nodes. In other words, a weight decides how much influence the input has on the output. As mentioned, except for the last layer 316, the weights applied to each of the nodes in the plurality of hidden layers 304 remain unchanged.

The output layer 306 is the last layer in the neural network 300 and receives input from the last hidden layer 316.

The addition of feature layer 316 in the neural network 300 can be considered a "cascaded configuration". In the cascaded configuration, additional trainable parameters (e.g. weight and bias) are introduced at the newly added feature layer 316. The additional parameters are able to generate a new set of features. The additional features capture the domain variant features of the target domain. The adaptation process can be considered a fine-tuning process of the model. As described above, during the fine-tuning process, the original model's parameters (e.g. weight and bias) are kept frozen and unchanged. The newly added parameters (e.g. weight and bias) of the newly added feature layer 316 are trained. The output at the output layer 306 is referred to as a "final feature".

The adaptation phase of the neural networks 200 and 300 described above can be considered "self-paced learning" which involves an iterative process that gradually improves the performance of the pre-trained model on the new target domain. For each iteration, a user chooses the most confident samples (i.e. features with least training errors) from the target domain to train the additional layers.

Figure 4:
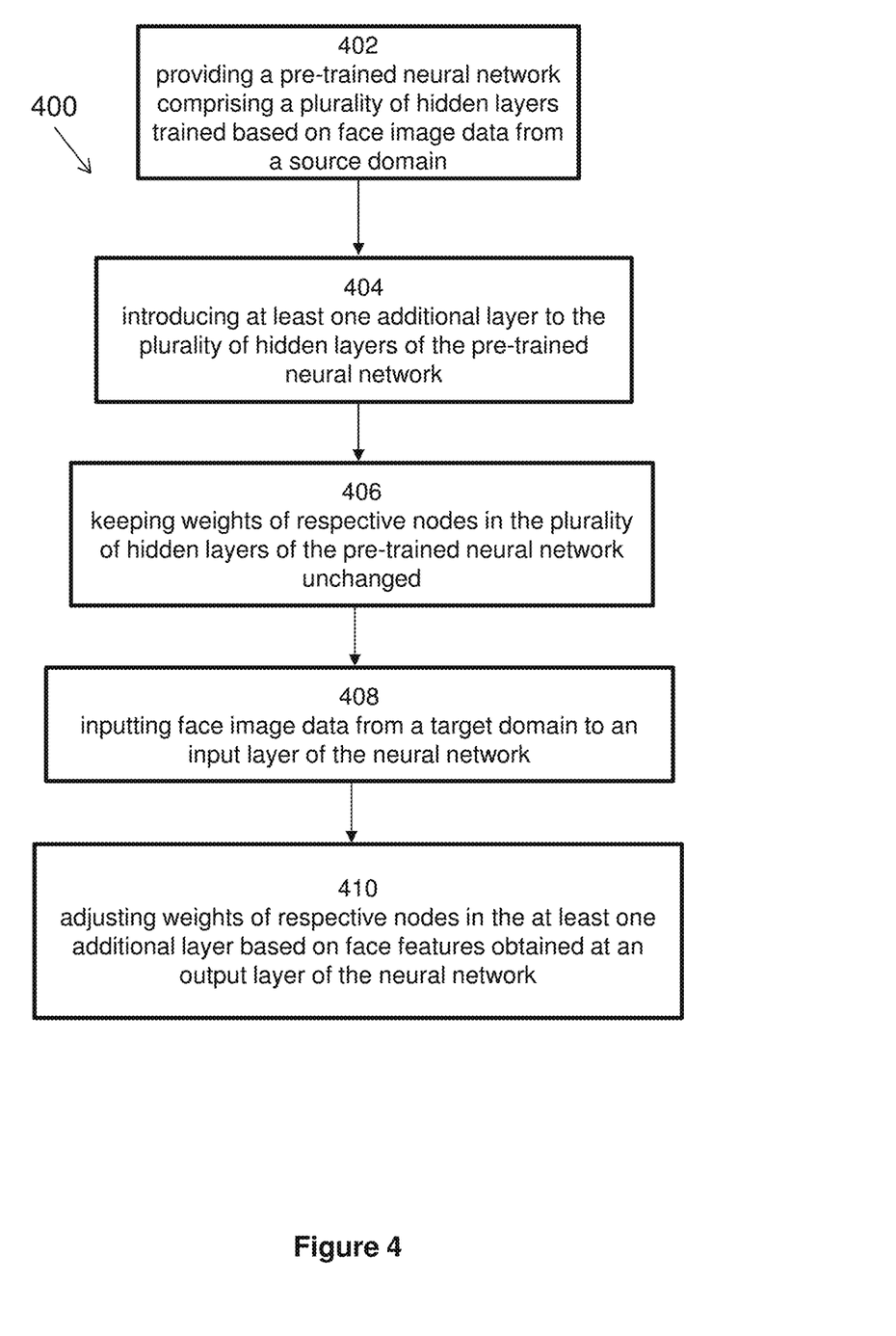
FIG. 4 is a flow chart illustrating a method for training a neural network used to extract face features from face images, according to an embodiment.

FIG. 4 is a flow chart illustrating a method 400 for training a neural network used to extract face features from face images, according to an embodiment. Each of the steps of the method may be performed sequentially; or when applicable, in parallel or in any order.

The method 400 includes step 402 of providing a pre-trained neural network that has been trained with face image data from a source domain. The pre-trained neural network includes a plurality of hidden layers.

The method 400 further includes step 404 of introducing at least one additional layer to the plurality of hidden layers of the pre-trained neural network.

The method 400 further includes step 406 of keeping weights that were applied to each node in the plurality of hidden layers of the pre-trained neural network unchanged.

The method 400 further includes step 408 of inputting face image data from a target domain to an input layer of the neural network.

The method 400 further includes step 410 of iteratively adjusting weights of respective nodes in the at least one additional layer based on face features obtained at an output layer of the neural network.

At least one additional layer can be introduced to the pre-trained neural network in parallel with the last hidden layer of the pre-trained neural network. In such case, the method 400 further includes the steps of: (i) performing a concatenation of an output from the at least one additional layer and an output from the last hidden layer of the pre-trained neural network; and (ii) passing on the concatenated outputs to the output layer of the neural network.

At least one additional layer can be introduced to the pre-trained neural network after the last hidden layer of the pre-trained neural network. Alternatively, at least one additional layer can be introduced to the pre-trained neural network after the last hidden layer of the pre-trained neural network, and at least one other additional layer can be introduced to the pre-trained neural network in parallel with the last hidden layer of the pre-trained neural network.

With regard to step 410, the method 400 can further include the sub-steps of: (i) selecting, from the face features obtained at the output layer of the neural network, a plurality of most confident face features (i.e. features with least training errors); and (ii) during each training iteration, adjusting the weights that are applied to each node in each of the at least one additional layer based on the selected plurality of most confident face features.

The source domain is associated with a first country or geographical region and the target domain is associated with a second country or geographical region that is different from the first.

The techniques described in this specification produce one or more technical effects. In particular, embodiments of the invention seek to effectively improve the features in the new target domain by feature transformation and feature augmentation. The cascaded configuration can transform the original features into adapted features; while the parallel configuration can generate complimentary features to augment the original features. Both the cascaded configuration and parallel configuration can enhance and improve the original features. Thus, using embodiments of the invention, a model is able to extract more powerful features and achieve better performance in the target domain.

Embodiments of the invention seek to provide a new model structure, in which additional layers with trainable parameters are employed on a pre-trained model. The additional layers can be arranged in a cascaded or parallel configuration.

In the parallel configuration, an additional layer is added in parallel with the last hidden layer of the pre-trained model. In the cascaded configuration, an additional layer is added after the last hidden layer of the pre-trained model.

In either case, during training of the new model (i.e. with the additional layer), the original weights applied to each of the nodes in the hidden layers of the pre-trained model are kept frozen and remain unchanged. For each training iteration, the most confident samples are chosen from the new target domain to train the additional layer.

Figure 5:
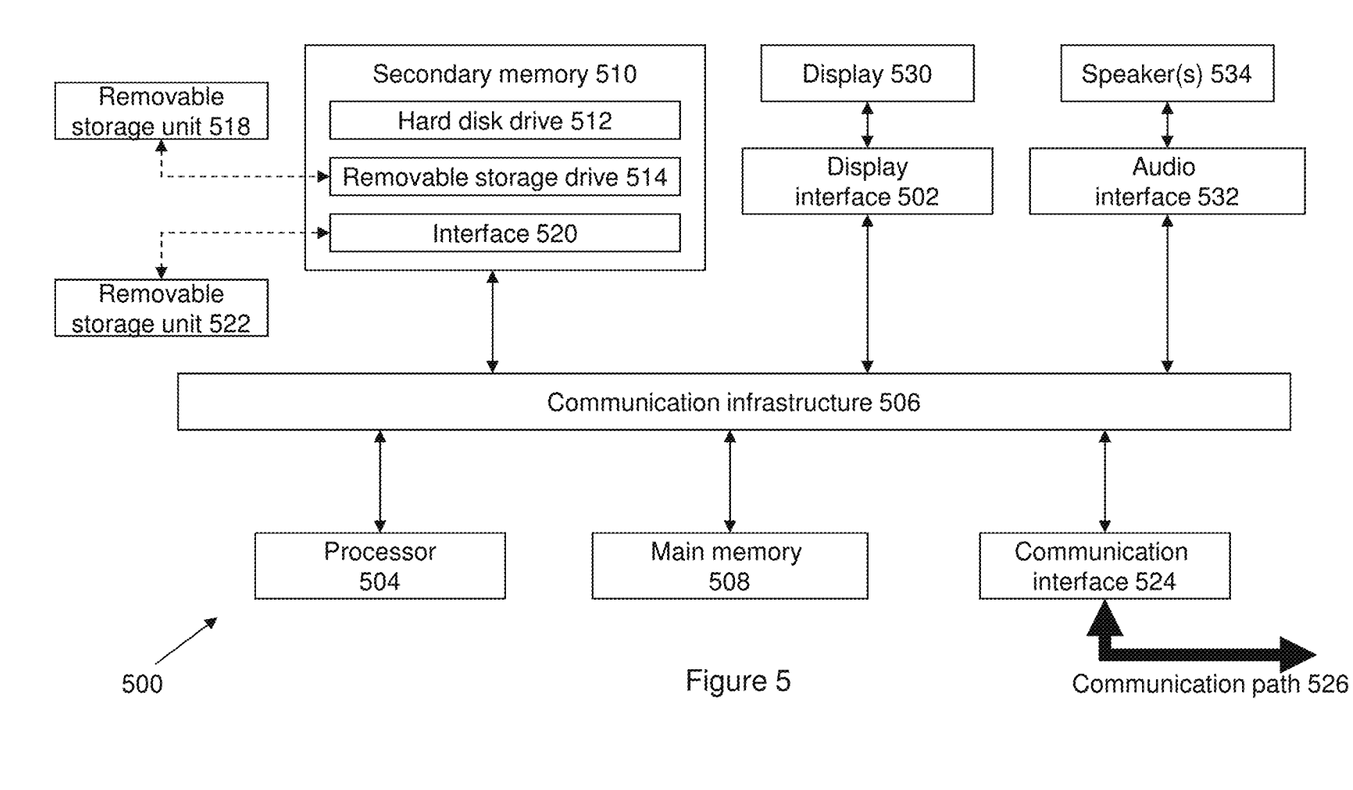
FIG. 5 shows a schematic diagram of a computer system suitable for use in executing at least some steps of the method for training a neural network used to extract face features from face images.

FIG. 5 shows a schematic diagram of a computer system suitable for use in executing at least some steps of the method for training a neural network used to extract face features from face images.

The following description of the computer system/computing device 500 is provided by way of example only and is not intended to be limiting.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a hard disk drive 512 and/or a removable storage drive 514, which may include a magnetic tape drive, an optical disk drive, or the like. The removable storage drive 514 reads from and/or writes to a removable storage unit 518 in a well-known manner. The removable storage unit 518 may include a magnetic tape, optical disk, or the like, which is read by and written to by removable storage drive 514. As will be appreciated by persons skilled in the relevant art(s), the removable storage unit 518 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 520. Examples of a removable storage unit 522 and interface 520 include a removable memory chip (such as an EPROM or PROM) and associated socket, and other removable storage units 522 and interfaces 520 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port, an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

Optionally, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage unit 518, removable storage unit 522, a hard disk installed in hard disk drive 512, or a carrier wave carrying software over communication path 526 (wireless link or cable) to communication interface 524. Computer readable storage media refers to any non-transitory tangible storage medium that provides recorded instructions and/or data to the computing device 500 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the hard disk drive 512, or the interface 520. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

According to one embodiment, there is provided a system for training a neural network used to extract face features from face images. The system includes a processor module (such as the processor 504) and a memory module (such as the secondary memory 510) including computer program code. The memory module and the computer program code are configured to, with the processor module, cause the system at least to retrieve, from the memory module, a pre-trained neural network comprising a plurality of hidden layers trained based on face image data from a source domain.

The system may be further caused to introduce at least one additional layer to the plurality of hidden layers of the pre-trained neural network and keep weights of respective nodes in the plurality of hidden layers of the pre-trained neural network unchanged.

The system may be further caused to input face image data from a target domain to an input layer of the neural network and iteratively adjust weights of respective nodes in the at least one additional layer based on face features obtained at an output layer of the neural network.

The at least one additional layer may be introduced to the pre-trained neural network in parallel with the last hidden layer of the pre-trained neural network. The system may be further caused to perform a concatenation of an output from the at least one additional layer and an output from the last hidden layer of the pre-trained neural network; and pass on the concatenated outputs to the output layer of the neural network.

The at least one additional layer may also be introduced to the pre-trained neural network after the last hidden layer of the pre-trained neural network.

The system may be further caused to select, from the face features obtained at the output layer of the neural network, a plurality of face features with least training errors; and iteratively adjust weights of respective nodes in the at least one additional layer based on the selected plurality of face features with least training errors.

The source domain is associated with a first country or geographical region and the target domain is associated with a second country or geographical region that is different from the first.

According to another embodiment, there is provided a computer-implemented method for face recognition, comprising the following steps. The first step involves inputting, via an input module, face image data from a target domain to an input layer of a neural network. The neural network comprises (i) a pre-trained neural network comprising a plurality of hidden layers trained based on face image data from a source domain; and (ii) at least one additional layer introduced to the plurality of hidden layers of the pre-trained neural network. The face image data is then passed through the plurality of hidden layers for processing.

The next step involves obtaining, from an output module, face features from an output layer of the neural network.

The next step involves configuring a processing module to iteratively adjust weights of respective nodes in the at least one additional layer based on the obtained face features while keeping weights of respective nodes in the plurality of hidden layers of the pre-trained neural network unchanged.

According to another embodiment, there is provided an apparatus for face recognition. The apparatus includes an input module, output module and processing module. The input module is configured to receive face image data from a target domain. The processing module is configured to feed the face image data to an input layer of a neural network. The neural network comprises: (i) a pre-trained neural network comprising a plurality of hidden layers trained based on face image data from a source domain; and (ii) at least one additional layer introduced to the plurality of hidden layers of the pre-trained neural network. The face image data is then passed through the plurality of hidden layers for processing. The output module is configured to output face features from an output layer of the neural network.

The processing module is further configured to iteratively adjust weights of respective nodes in the at least one additional layer based on the obtained face features while keeping weights of respective nodes in the plurality of hidden layers of the pre-trained neural network unchanged.

One or more components of the computer system 500 may be used to realize the above-mentioned input module, output module and/or processing module.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, some of the present embodiments relate to face recognition. However, the invention is not limited to face recognition and may be used for other applications.

What is claimed is:

1. A computer-implemented method comprising:
    training a pre-trained neural network, wherein the pre-trained neural network comprises:

an input layer;
a plurality of hidden layers, wherein each of the plurality of hidden layers has a set of nodes, wherein each of the set of nodes has an associated weight pre-trained based on a first set of data corresponding to a source domain; and
an output layer,
wherein training the pre-trained neural network comprises:
introducing at least one additional layer to the plurality of hidden layers, wherein the at least one additional layer has one or more nodes having associated weights;
keeping weights of the set of nodes in the plurality of hidden layers of the pre-trained neural network unchanged;
inputting a second set of data corresponding to a target domain to the input layer;
processing the second set of data in the plurality of hidden layers based on the weights associated with the set of nodes of each of the plurality of hidden layers by calculating a weighted sum based on the weights;
determining whether to activate each of the set of nodes in each of the plurality of hidden layers based on the weighted sum and a predetermined activation function; and
iteratively adjusting weights of the one or more nodes in the at least one additional layer based on features obtained at the output layer comprising:
for each iteration,
selecting, from the features obtained at the output layer, a set of features corresponding to a particular amount of training errors; and
adjusting the weights of the one or more nodes in the at least one additional layer based on the selected set of features.

2. The computer-implemented method of claim 1,
wherein the at least one additional layer is a feature layer introduced to the pre-trained neural network in parallel with a last hidden layer of the plurality of hidden layers farthest from the input layer, and
wherein introducing the at least one additional layer comprises introducing additional trainable parameters for converting the features obtained at the output layer to adapted features as an output from the at least one additional layer.

3. The computer-implemented method of claim 2, further comprising:
performing a concatenation of the output from the at least one additional layer and an output from the last hidden layer of the pre-trained neural network to obtain concatenated outputs; and
passing on the concatenated outputs to the output layer.

4. The computer-implemented method of claim 1, wherein the at least one additional layer is introduced to the pre-trained neural network after a last hidden layer of the pre-trained neural network.

5. The computer-implemented method of claim 1, wherein the source domain is associated with a first country or geographical region and the target domain is associated with a second country or geographical region that is different from the first country or geographical region.

6. A computer-implemented system for training a neural network, comprising:
a processor module; and
a memory module including computer program code;
the memory module and the computer program code configured to, with the processor module, cause the computer-implemented system at least to:
retrieve, from the memory module, a pre-trained neural network comprising:
an input layer;
a plurality of hidden layers, wherein each of the plurality of hidden layers has a set of nodes, wherein each of the set of nodes has an associated weight pre-trained based on a first set of data corresponding to a source domain; and
an output layer;
introduce at least one additional layer to the plurality of hidden layers, wherein the at least one additional layer has one or more nodes having associated weights;
keep weights of the set of nodes in the plurality of hidden layers of the pre-trained neural network unchanged;
input a second set of data corresponding to a target domain to the input layer;
process the second set of data in the plurality of hidden layers based on the weights associated with the set of nodes of each of the plurality of hidden layers by calculating a weighted sum based on the weights;
determine whether to activate each of the set of nodes in each of the plurality of hidden layers based on the weighted sum and a predetermined activation function; and
iteratively adjust weights of the one or more nodes in the at least one additional layer based on features obtained at the output layer comprising:
for each iteration,
select, from the features obtained at the output layer, a set of features corresponding to a particular amount of training errors; and
adjust the weights of the one or more nodes in the at least one additional layer based on the selected set of features.

7. The computer-implemented system of claim 6,
wherein the at least one additional layer is a feature layer introduced to the pre-trained neural network in parallel with a last hidden layer of the plurality of hidden layers farthest from the input layer, and
wherein introducing the at least one additional layer comprises introducing additional trainable parameters for converting the features obtained at the output layer to adapted features as an output from the at least one additional layer.

8. The computer-implemented system of claim 7, wherein the computer-implemented system is further caused to:
perform a concatenation of the output from the at least one additional layer and an output from the last hidden layer of the pre-trained neural network to obtain concatenated outputs; and
pass on the concatenated outputs to the output layer.

9. The computer-implemented system of claim 6, wherein the at least one additional layer is introduced to the pre-trained neural network after a last hidden layer of the pre-trained neural network.

10. The computer-implemented system of claim 6, wherein the source domain is associated with a first country or geographical region and the target domain is associated with a second country or geographical region that is different from the first country or geographical region.

11. A non-transitory, computer-readable medium storing one or more instructions executable by a computer system to perform one or more operations comprising:

training a pre-trained neural network, wherein the pre-trained neural network comprises:
an input layer;
a plurality of hidden layers, wherein each of the plurality of hidden layers has a set of nodes, wherein each of the set of nodes has an associated weight pre-trained based on a first set of data corresponding to a source domain; and
an output layer,
wherein training the pre-trained neural network comprises:
introducing at least one additional layer to the plurality of hidden layers, wherein the at least one additional layer has one or more nodes having associated weights;
keeping weights of the set of nodes in the plurality of hidden layers of the pre-trained neural network unchanged;
inputting a second set of data corresponding to a target domain to the input layer;
processing the second set of data in the plurality of hidden layers based on the weights associated with the set of nodes of each of the plurality of hidden layers by calculating a weighted sum based on the weights;
determining whether to activate each of the set of nodes in each of the plurality of hidden layers based on the weighted sum and a predetermined activation function; and
iteratively adjusting weights of the one or more nodes in the at least one additional layer based on features obtained at the output layer comprising:
for each iteration,
selecting, from the features obtained at the output layer, a set of features corresponding to a particular amount of training errors; and
adjusting the weights of the one or more nodes in the at least one additional layer based on the selected set of features.

12. The non-transitory, computer-readable medium of claim 11,
wherein the at least one additional layer is a feature layer introduced to the pre-trained neural network in parallel with a last hidden layer of the plurality of hidden layers farthest from the input layer, and
wherein introducing the at least one additional layer comprises introducing additional trainable parameters for converting the features obtained at the output layer to adapted features as an output from the at least one additional layer.

13. The non-transitory, computer-readable medium of claim 12, further comprising one or more instructions for:
performing a concatenation of the output from the at least one additional layer and an output from the last hidden layer of the pre-trained neural network to obtain concatenated outputs; and
passing on the concatenated outputs to the output layer.

14. The non-transitory, computer-readable medium of claim 11, wherein the at least one additional layer is introduced to the pre-trained neural network after a last hidden layer of the pre-trained neural network.

15. The non-transitory, computer-readable medium of claim 11, wherein the source domain is associated with a first country or geographical region and the target domain is associated with a second country or geographical region that is different from the first country or geographical region.

* * * * *